US010652099B2

(12) United States Patent
Bae et al.

(10) Patent No.: US 10,652,099 B2
(45) Date of Patent: *May 12, 2020

(54) SITE ASYMMETRIC TOPOLOGY RECONCILIATION IN A COMPUTER CLUSTER

(71) Applicant: International Business Machines Corporation, Armonk, NY (US)

(72) Inventors: Myung M. Bae, Pleasant Valley, NY (US); Esdras E. Cruz-Aguilar, Round Rock, TX (US); Perinkulam I. Ganesh, Round Rock, TX (US); Savitri Hunasheekatti, Bangalore (IN); Dimpu K. Nath, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,416

(22) Filed: Sep. 4, 2018

(65) Prior Publication Data

US 2019/0007276 A1   Jan. 3, 2019

Related U.S. Application Data

(63) Continuation of application No. 15/096,419, filed on Apr. 12, 2016.

(51) Int. Cl.
*H04L 12/24* (2006.01)
*H04L 12/26* (2006.01)

(52) U.S. Cl.
CPC .......... *H04L 41/12* (2013.01); *H04L 43/0811* (2013.01); *H04L 43/10* (2013.01)

(58) Field of Classification Search
CPC ............................ H04L 43/0811; H04L 43/10
USPC ........ 709/224, 225, 226, 239; 370/311, 318, 370/352
See application file for complete search history.

(56) References Cited

U.S. PATENT DOCUMENTS

| 6,757,836 B1 * | 6/2004 | Kumar ................ G06F 11/1425 714/11 |
| 9,225,606 B2 | 12/2015 | Guo et al. |
| 9,225,637 B2 | 12/2015 | Ramanujan et al. |
| 2007/0100828 A1 | 5/2007 | Holt |

(Continued)

OTHER PUBLICATIONS

"Hierarchical Quasi-Clustering Methods for Asymmetric Networks"—Carlsson et al, Stanford University, Mar. 2014 http://proceedings.mlr.press/v32/carlsson14.pdf (Year: 2014).*

(Continued)

*Primary Examiner* — Randy A Scott
(74) *Attorney, Agent, or Firm* — Martin & Associates, LLC; Bret J. Petersen (57) ABSTRACT

A site asymmetric topology reconciliation module (SATRM) provides a stable topology for nodes located at different sites of the cluster during loss and reconnection of communication links between the sites. The SATRM monitors the cluster topology for changes in communication links between nodes. When there is an unstable cluster topology due to a loss in the communication links, the SATRM severs links to one or more sites to create a stable topology. When a communication links recovers, the SATRM merges sites to create a stable topology with the sites connected with the recovered communication links.

14 Claims, 6 Drawing Sheets

(56) References Cited

U.S. PATENT DOCUMENTS

| | | | |
|---|---|---|---|
| 2014/0129696 A1* | 5/2014 | Browing | H04L 41/12 709/224 |
| 2014/0282384 A1 | 9/2014 | Pamer | |
| 2015/0143157 A1* | 5/2015 | Chen | H04L 67/1034 714/4.3 |
| 2016/0036924 A1* | 2/2016 | Koppolu | H04L 41/5054 709/224 |

OTHER PUBLICATIONS

Bee et al., "Site Asymmetric Topology Reconciliation in a Computer Cluster", U.S. Appl. No. 15/096,419, filed Apr. 12, 2016.

IBM, Appendix P—List of IBM Patents or Patent Applications Treated As Related, dated Oct. 1, 2018.

Anonymous, Preserving soundness of graph flow when merging changes in graph, IP.com article, IPCOM000205115D, Mar. 15, 2011.

Ramanathan, S., Multicast Tree Generation in Networks With Asymmetric Links, IEEE/ACM Transactions on Networking, vol. 4 No. 4, Aug. 1996.

* cited by examiner

SITE ASYMMETRIC TOPOLOGY RECONCILIATION IN A COMPUTER CLUSTER

BACKGROUND

1. Technical Field

This disclosure generally relates to computer clusters, and more specifically relates to a system and method for site asymmetric topology reconciliation in a computer cluster.

2. Background Art

A group of computers or compute nodes may be gathered into one virtual entity by a concept known as a cluster. Each computer or machine is a node in the cluster. Clusters are often used to provide high availability computing to important applications or processes. High availability means availability despite planned outages for upgrades or unplanned outages caused by hardware or software failures.

One or more compute nodes within a cluster may be geographically separated and may not have access to the local shared repository disk where configuration information and topology for the cluster is maintained. These geographically separated nodes may be grouped into a subset of the cluster known as a site. Thus, each site is a group of geographically collocated nodes that have a local copy of the cluster topology. The local copies of the topology are kept in synchronization by performing updates to each site's repository when a topology change occurs. Running a multiple site cluster introduces challenges related to sunders as communication across geographically separated areas cannot be guaranteed at all times. A "sunder" in the context of a multiple site cluster occurs when communication between sites breaks down, leading one site to have a different view of the cluster than another site. Such sunders can cause malfunction of the entire cluster and mismatch in configuration data negatively impacting the high availability of the cluster nodes.

BRIEF SUMMARY

The disclosure and claims herein relate to site asymmetric topology reconciliation in a computer cluster. A site asymmetric topology reconciliation module (SATRM) provides a stable topology for nodes located at different sites of the cluster during loss and reconnection of communication links between the sites. The SATRM monitors the cluster topology for changes in communication links between nodes. When there is an unstable cluster topology due to a loss in the communication links, the SATRM severs links to one or more sites to create a stable topology. When a communication link recovers, the SATRM merges sites to create a stable topology with the sites connected with the recovered communication links.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for site asymmetric topology reconciliation in a computer cluster. A site asymmetric topology reconciliation module (SATRM) provides a stable topology for nodes located at different sites of the cluster during loss and reconnection of communication links between the sites. The SATRM monitors the cluster topology for changes in communication links between nodes. When there is an unstable cluster topology due to a loss in the communication links, the SATRM severs links to one or more sites to create a stable topology. When a communication links recovers, the SATRM merges sites to create a stable topology with the sites connected with the recovered communication links.

Figure 1:
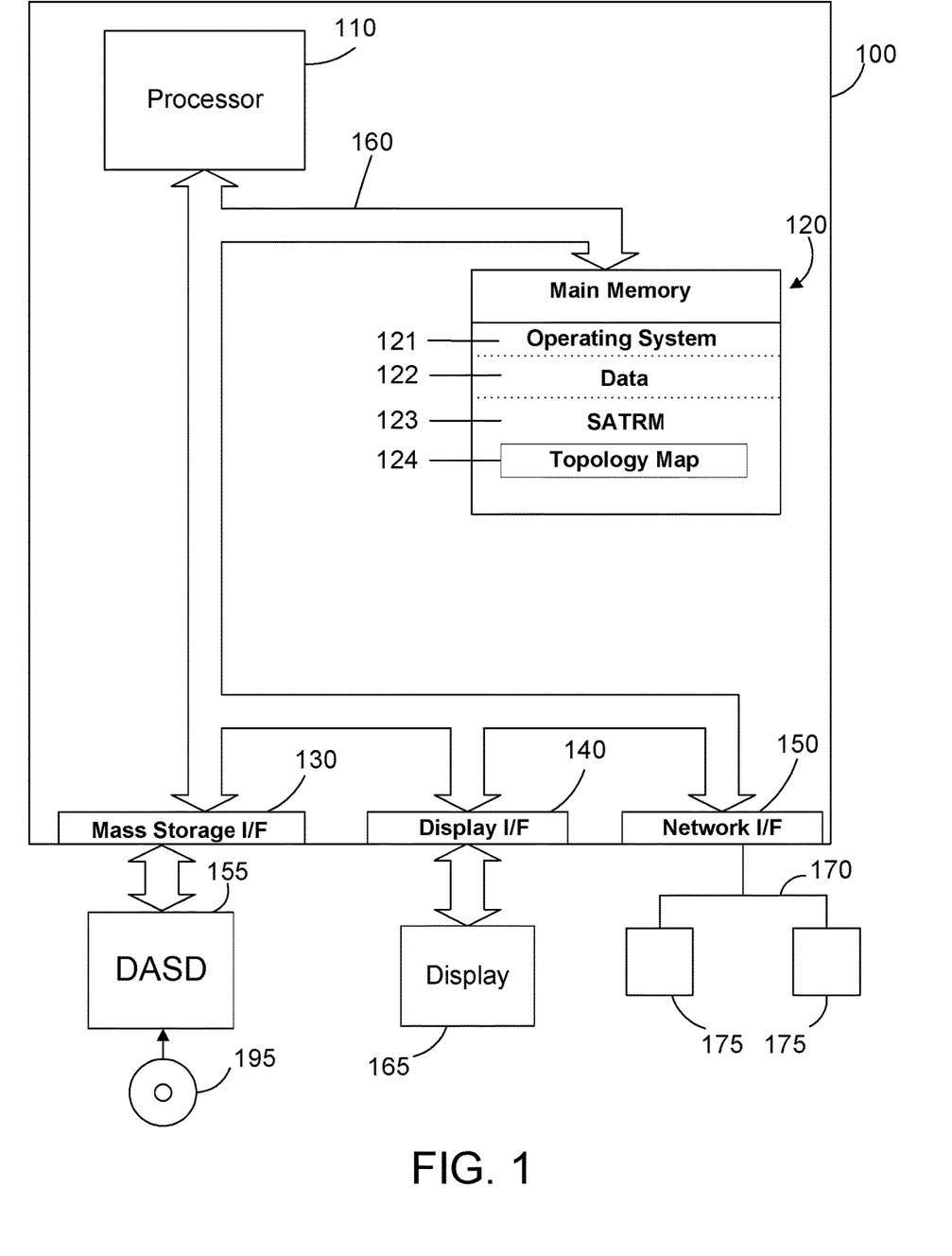
FIG. 1 is a block diagram a computer system with a site asymmetric topology reconciliation module as described herein to provide a stable topology for nodes located at different sites of the cluster during loss and reconnection of communication links between the sites.

Referring to FIG. 1, a computer system 100 is one suitable implementation of a computer system that is capable of performing the computer operations described herein including a site asymmetric topology reconciliation module (SATRM) which provides a stable topology for nodes located at different sites of a cluster during loss and reconnection of communication links between the sites as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and site asymmetric topology reconciliation module (SATRM) 123. The memory 120 may also include a topology map 124 for the cluster. Alternatively, the topology map 124 may be stored in the DASD 155.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, data 122, DATRM 123 and topology map 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121. Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
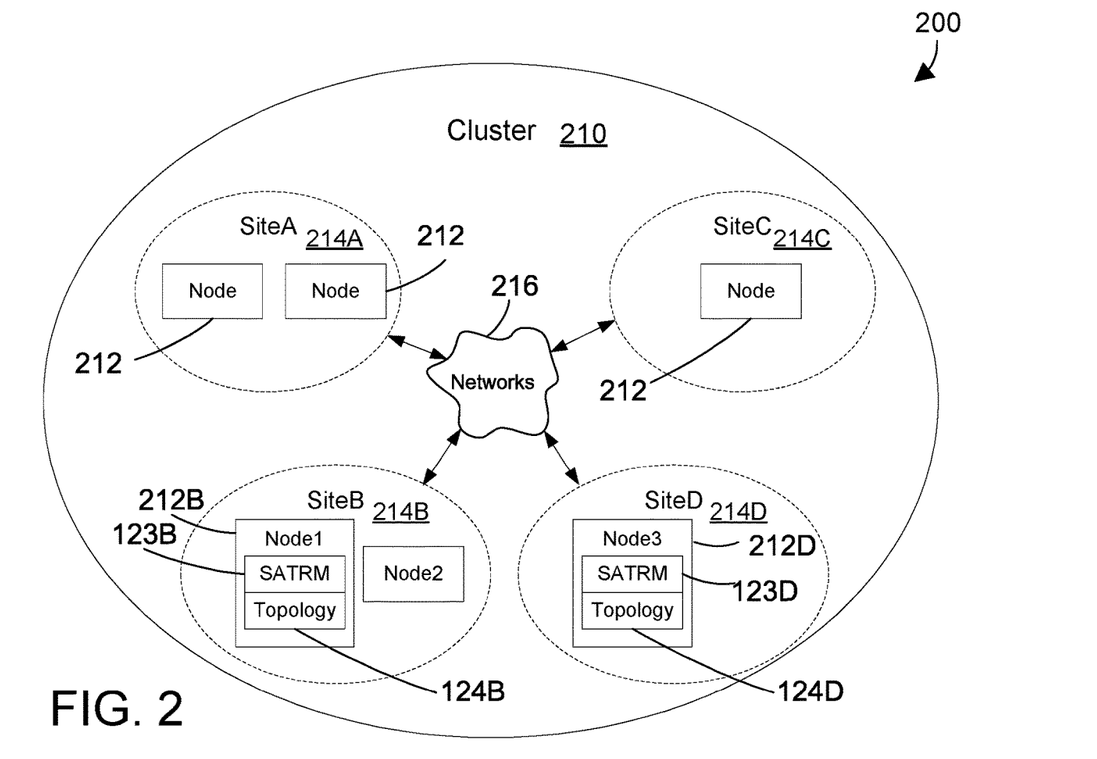
FIG. 2 is a simplified block diagram of a computer cluster with site asymmetric topology reconciliation.

FIG. 2 illustrates a simplified block diagram of a computer cluster 210 that incorporates site asymmetric topology reconciliation as described herein. The cluster 210 has one or more computers or nodes located in separate sites 214. Each site is a group of geographically collocated nodes. The nodes located in a site 214 may communicate over a local communication link (not shown). In the illustrated example, the sites 214 include siteA 214A, siteB 214B, siteC 214C and sitedD 214D. The sites 214 may each have one or more compute nodes 212 as shown. The sites 214 are communicatively connected by one or more communication links or paths as known in the prior art. In the illustrated example, the communication links between the sites 214 are represented in FIG. 2 by networks 216. The networks 216 may include a local area network (LAN), a wide area network (WAN), and/or the internet. The nodes of the sites may be connected in multiple and possibly redundant ways. In addition, communication links may be wired, wireless, Ethernet, TCP/IP, TCP, and any other currently available or yet to be developed communication mediums and protocols. As explained in more detail below communication links are employed to transmit "heartbeats" between the nodes 212. Further, it should be noted there are many possible computing architecture configurations, of which computing architecture 200 is only one simple example used for the purposes of this example.

Again referring to FIG. 2, the sites 214 each contain one or more nodes 212. The nodes 212 will typically each include a SATRM 123 introduced above. The SATRM 123 will include or have access to a local copy of the topology map 124 as introduced in FIG. 1. For example, siteB 214B includes a local copy of the topology map 124B in a local copy of the SATRM 123B located in node1 212B. Similarly, siteD 214D includes a local copy of the topology map 124D in a local copy of the SATRM 123D in node3 212D. Other nodes 212 may also have a SATRM with a topology map but are not show in FIG. 2. Thus a copy of the topology map 124 may be stored on one or more of the nodes of each site 214 or on a local storage medium available to the nodes of each site. The topology map 124 stores information about the cluster topology gained from heartbeat messages sent and received from other nodes. A heartbeat is a signal from a first node to a second node that enables the second node to determine whether the first node and the communication medium between the two nodes are functioning. The heartbeat is typically transmitted periodically once every 0.1 seconds. In the examples described herein, the heartbeat messages include information indicating how the nodes and connections are functioning to create the topology map 124. This information includes the local node's Upbeat and Downbeat state and the count or number of nodes the local node sees in the Upbeat state and the count or number of nodes the node sees in Downbeat state. As used herein an Upbeat state is a fully functional state where the node in this state is capable of participating in high availability. A Downbeat state is an interim state where a node has been booted up, hence capable of receiving and sending messages but not at fully operational. To increase redundancy, nodes within a cluster may transmit heartbeats over multiple interfaces, such as, but not limited to, an Ethernet, a storage area network (SAN), a data information service center (DISK) and a direct connection.

Figure 3:
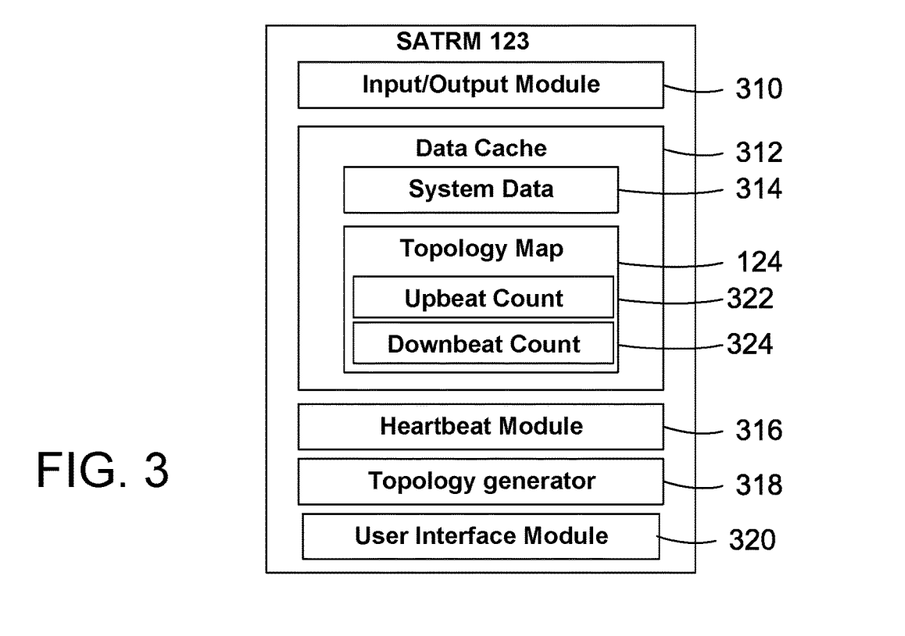
FIG. 3 is a simplified example of a site asymmetric topology reconciliation module.

FIG. 3 is a block diagram of SATRM 123 first introduced in FIG. 1. SATRM 123 includes an input/output (I/O) module 310, a data cache 312, a heartbeat module 316, topology generator 318 and a user interface (UI) module 320. In the described example, the SATRM 123 is code or logic stored on a computer or node such as the computer 100 illustrated in FIG. 1 and executes on one or more processors 110. I/O module 310 handles any communication SATRM 123 has with other components of the cluster 210, including corresponding SATRMs (not shown) executing on other nodes. Data cache 312 is a data repository for information, including system and node data that the SATRM 123 employs during normal operation. Examples of the types of information stored in data cache 312 include system data 314 and topology map 124 introduced above with reference to FIG. 1. The system data 314 stores data on various communication components of the computer cluster 210. The topology map 124 is a topology map of the cluster architecture 210 based upon responses received by a heartbeat module 316. The topology map 124 may include a total Upbeat count 322 and a total Downbeat count 324. These counts may be directly stored in the topology map 124 or may be derived from the site topology data stored in the topology map 124.

Heartbeat module 316 both generates and receives signals, or "heartbeats," to and from other nodes of the cluster 310. Topology generator 318 parses "gossip" heartbeats from other nodes and generates a topology 124 that indicates the current status of nodes and connections within cluster 210. UI component 320 enables administrators of SATRM 123 to interact with and to define the desired functionality of SATRM 123, primarily by setting operation parameters stored in system data 314.

As used herein, unstable topology means the nodes in different sites in the cluster topology see an asymmetric view of the other nodes in the cluster which means some of the nodes see nodes on a different number sites through active connections. When a set of sites have an asymmetric view, cluster wide locks cannot be acquired correctly leading to corruption and loss of high availability. This loss of connection is sometimes referred to as sunder of the cluster. When sunder take place, it is desirable to take immediate action to ensure the surviving sites form stable and sustainable islands as described further below. When the lost communication link comes back up, a merge can be performed to join the islands to form larger stable islands. Forming smaller, stable islands is preferably achieved by severing links as described further below.

Figure 4A:
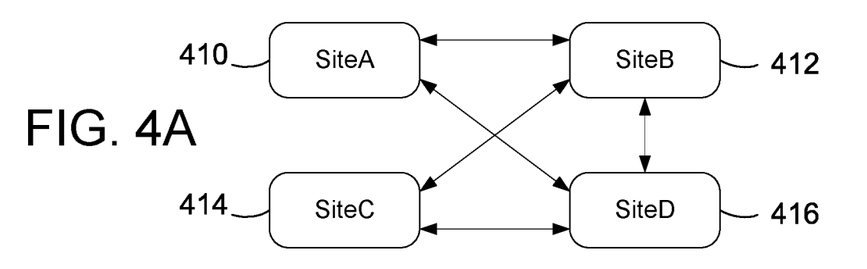
FIGS. 4A-4D illustrate examples of stable and unstable cluster topologies.
Figure 4B:
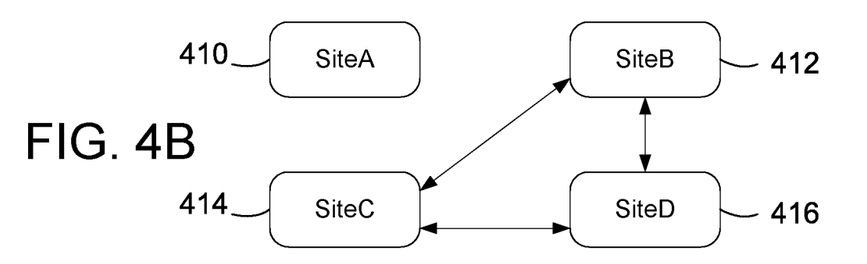

FIGS. 4A-4D illustrate examples of stable and unstable cluster topologies of a cluster having nodes in four sites, namely siteA 410, siteB 412, siteC 414 and siteD 416. FIG. 4A shows an unstable cluster topology where the sites see an asymmetric view of the cluster. Arrows between the sites represent healthy communication links between the sites. In the example shown in FIG. 4A, siteA 410 and siteC 412 can see only two other sites while siteB 412 and siteD 416 can see three other sites. The unstable condition shown in FIG. 4A results from a communication link or connection between siteA and siteC going down or otherwise losing connection. The unstable cluster topology shown in FIG. 4A can be made stable by severing links to siteA 410 or siteC 414. The SATRM preferably selects the node with the lowest priority and severs the links to create a stable topology. For the example in FIG. 4A, siteB 414 has a higher priority so the links to siteA 410 are severed resulting in the stable topology shown in FIG. 4B. The cluster topology represented in FIG. 4B is stable since each site in the cluster island (siteB 412, siteC 414 and siteD 416) see the same number of nodes over healthy communication links as indicated by the arrows between the sites.

Figure 4C:
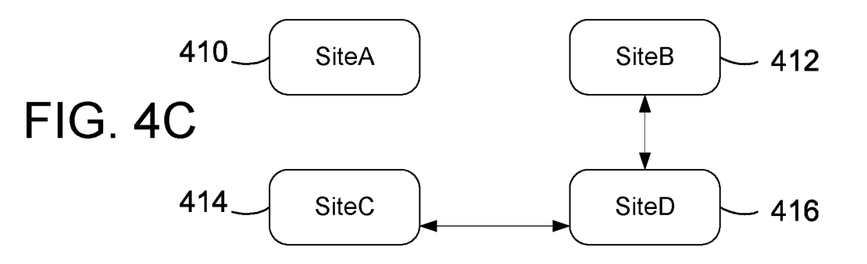
Figure 4D:
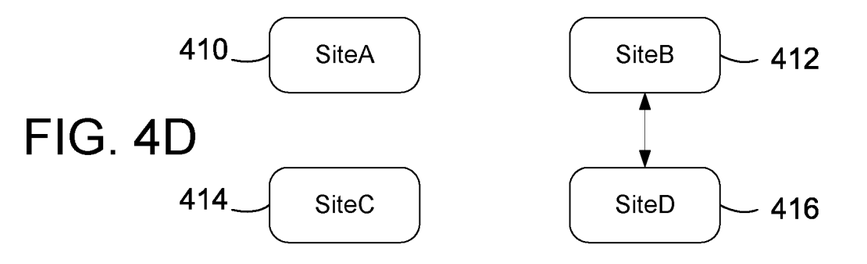

FIG. 4C illustrates another example of an unstable cluster topology. In the example shown in FIG. 4C, siteB 412 and siteC 414 can see only one other site while siteD 416 can see two other sites. The unstable condition shown in FIG. 4C results from a communication link or connection between siteB 412 and siteC 414 going down or otherwise losing connection in the topology shown in FIG. 4B. The unstable cluster topology shown in FIG. 4C can be made stable by severing the link between siteC 414 and siteD 416 as shown in FIG. 4D.

In the figures, arrows between the sites of the cluster represent communication links between nodes within the sites. As introduced above, the communication links exchange a gossip or heart beat message similar to that known in the prior art. As introduced above, heart beat messages herein exchanges the number of nodes it sees at other sites over a communication link that is in an "Upbeat or Downbeat state. A node is said to be in an Upbeat state when it has a heartbeat and is fully operational, and is said to be in a Downbeat state when it can exchange heartbeat packets but is not fully functional. If a communication link is not functional then no heart beat message is communicated. Each node adds the number of Upbeat and Downbeat node connection states to the topology map 124. The SATRM 123 of each node can thus use the topology 124 map to see a mismatch of Upbeat and Downbeat counts of the communication links and nodes to determine whether there is an unstable topology in the cluster.

Figure 5A:
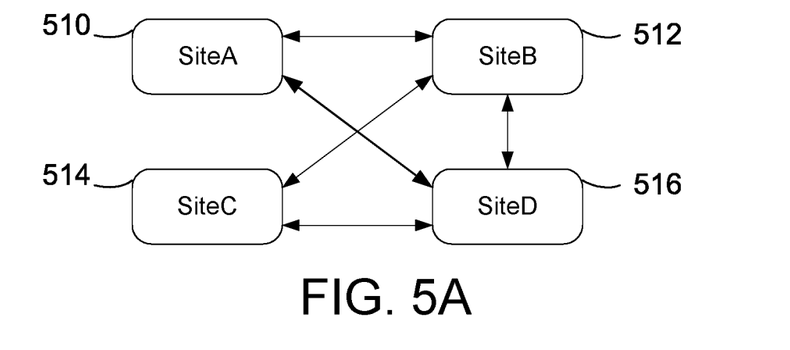
FIGS. 5A-5C illustrate an example of site asymmetric topology reconciliation that severs communication links to provide a stable topology of nodes across a cluster with four sites.
Figure 5B:
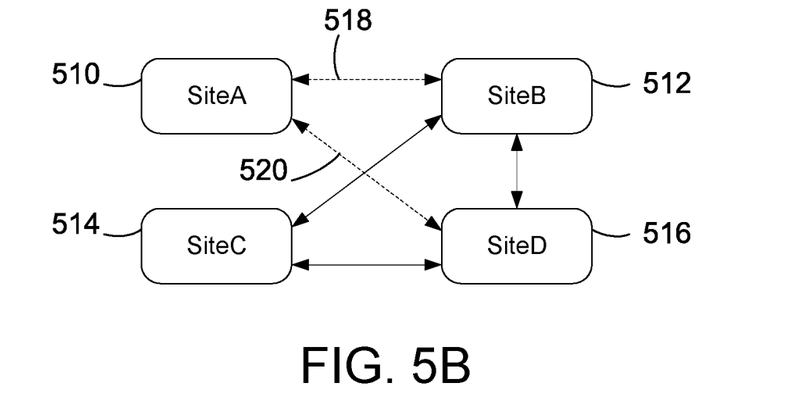
Figure 5C:
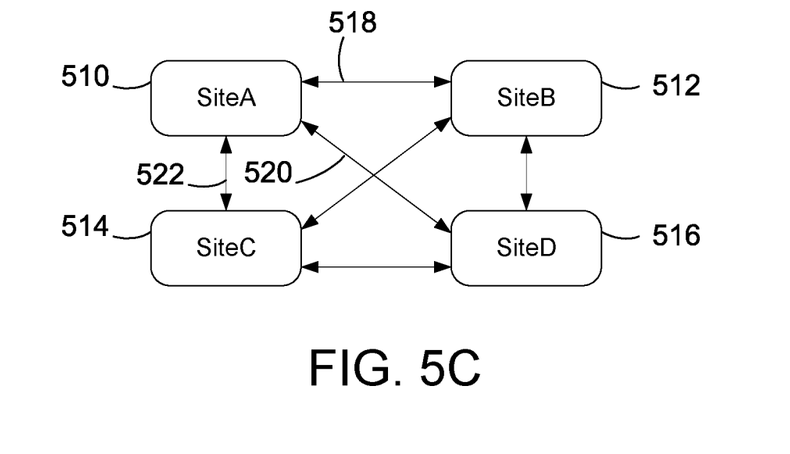

FIGS. 5A-5C illustrate a more detailed example of site asymmetric topology reconciliation. Similar to above, the cluster in this example has nodes in four sites, namely siteA 510, siteB 512, siteC 514 and siteD 516. Arrows between the sites represent communication links between nodes within the sites. In this example, there is no arrow shown between siteA 510 and siteC 514. The communication link between these two sites is not functional and thus is shown as a missing communication link. With this communication link missing, siteB 512 and siteD 516 see a mismatch of up and down nodes compared to siteA 510 and siteC 514. These links are reflected in the topology map stored in each site as shown in FIG. 2. SiteB 512 and siteD 516 each see connections to three sites, while siteA 510 and siteC 514 each see a connection to two sites. The SATRM 123 at each site will react to the mismatch of Upbeat and Downbeat node counts and sever the appropriate communication links to make the cluster topology stable as described herein. In the illustrated example, communication links are severed to balance the topology by placing one or more communication links into a restricted state. In the example shown in FIG. 5, the communication links 518 and 520 are placed in the restricted state as described below. In the restricted state, only a special type of packet message is exchanged that indicates the heath or the state of the communication link. When a remote site receives the health packet indicating the restricted state it may restrict the interface from it's side as well to place the communication link into the restricted state from both sides.

As introduced above, the SATRM preferably selects the site with the lowest priority and severs the links to create a stable topology. In this example, siteA 510 has the lower priority. Thus the siteB 512 and siteD 516 will pick siteA 510 which has the lowest priority and stop communicating with it by setting the communication links 518 and 520 in the restricted state (shown as a dotted arrow). With the loss of heartbeat due to the restricted state, nodes from siteA 510 will mark nodes from siteB 512 and siteD 516 as down. Similarly nodes at siteB 512 and siteD 516 will mark siteA 510 down. The cluster topology will then take form as shown in FIG. 5B.

When a broken communication link is restored, the restricted link becomes unrestricted and heartbeat messages are allowed to be exchanged over the communication link. If the SATRM 123 then detects a stable topology where all nodes have the same number of Upbeat counts and Downbeat counts, then a larger merge is possible. In the example shown in FIG. 5, when the communication link 522 between siteA and siteC is restored the restricted link status for the communication links to siteA 518, 520 would be in removed or reset. This would result in the Up and Downbeat count on all sites of the cluster to be the same. The SATRM would detect this topology as being a stable topology and could then initiate a merge of the nodes into the cluster. The topology would then appear as shown in FIG. 5C with the link 522 between siteA 510 and siteC now functioning and the previously restricted links 518 and 520 are now unrestricted. A merge can be completed in the manner known in the prior art to pull cluster configuration information from a "winning" side to a "losing" side. There are several criteria for choosing the winning side and the losing side. Normally the losing side would be the side with the least number of nodes. The information of the node count is normally included in the heartbeat messages and in the topography. The winning and losing side could also be based on priority. In the illustrated example, the winning side is siteA 510. The system will reboot the nodes from the losing site siteC 514. The losing site upon coming back from reboot, in this case siteC 514, will then pull the latest cluster configuration information from the winning side siteA 510, and siteC 514 will overwrite it's own repository using the cluster configuration from siteA 510 which includes the topology map. When the nodes come up they will join the cluster with the latest configuration and the entire cluster would be in synchronization.

Figure 6:
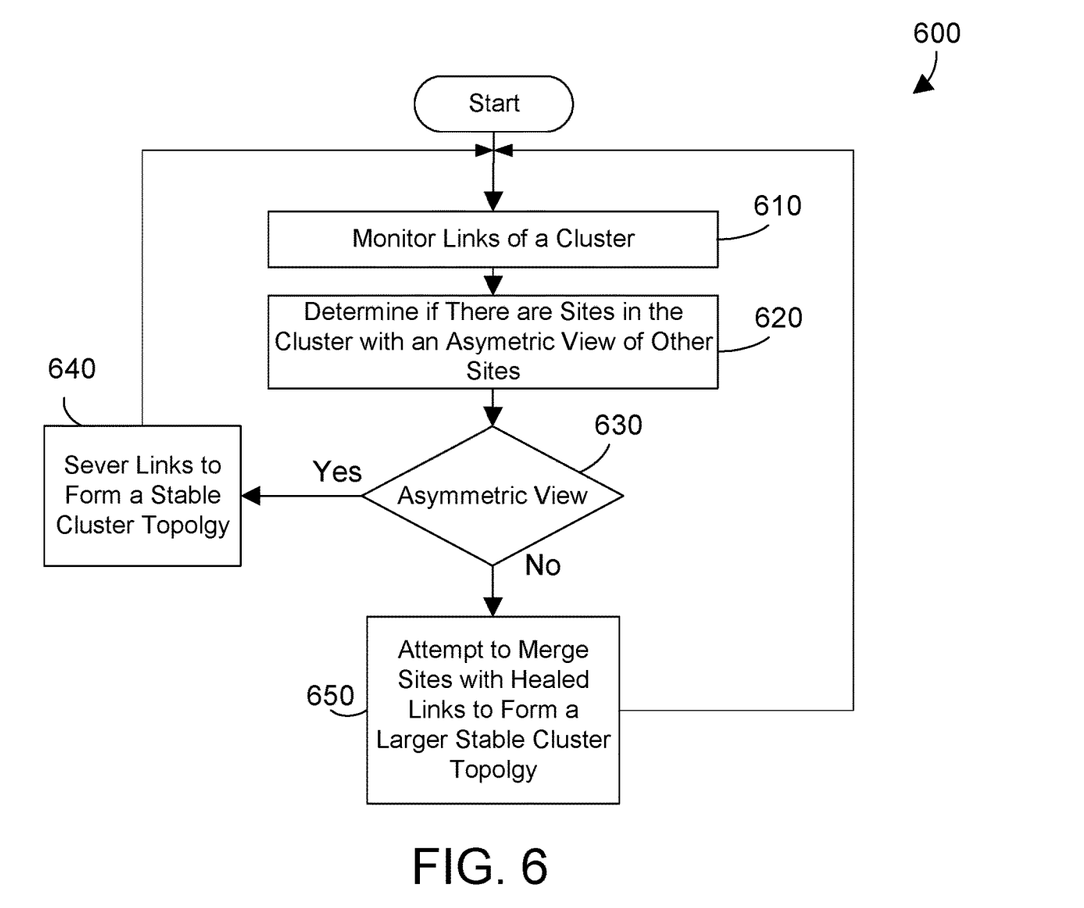
FIG. 6 is a flow diagram of a method to provide a stable topology for nodes located at different sites of the cluster during loss and reconnection of communication links between the sites.

Referring to FIG. 6, a method 600 shows one suitable example for site asymmetric topology reconciliation. Portions of method 600 are preferably performed by the site asymmetric topology reconciliation module (SATRM) 123 shown in FIG. 1. First, monitor communication links of a cluster (step 610). Next, determine if there are sites in the cluster with an asymmetric view of the other sites (step 620). If there is an asymmetric view (step 630=yes) then sever links in the cluster to form a stable cluster topology (step 640) and return to step 610. If there is not an asymmetric view then there is a stable topology (step 630=no), then attempt to merge sites with healed links to form a larger stable cluster topology (step 650) and return to step 610. Method 600 is then done.

Figure 7:
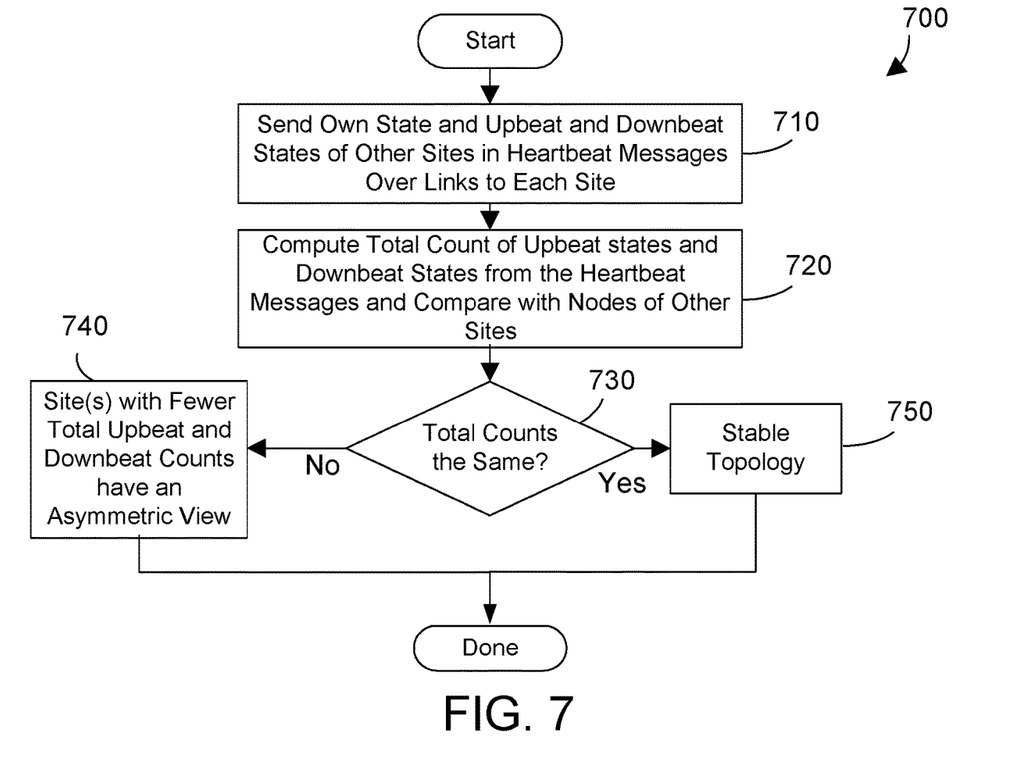
FIG. 7 is a flow diagram of a specific method for step 620 in FIG. 6.

FIG. 7 shows one suitable example of a method 700 for determining if there are sites in the cluster with an asymmetric view of the other sites. Method 700 thus shows a suitable method for performing step 620 in method 600. First, each node sends its own state and the Upbeat state and Downbeat state of nodes in other sites in heartbeat messages over communication links in the cluster to every other node in the cluster at each site (step 710). At some periodic interval, compute the total count of Upbeat states and Downbeat states from state information provided in the heartbeat message and compare it with count information provided in the heartbeat message from nodes of other sites (step 720). If the total Upbeat and Downbeat counts are not the same (step 730=no) then the site(s) with fewer total Upbeat and Downbeat counts have an asymmetric view of the cluster (step 740) and the method is done. When the total Upbeat and Downbeat counts are the same (step 730=yes) then the cluster topology is a stable topology (step 750). The method 700 is then done.

Figure 8:
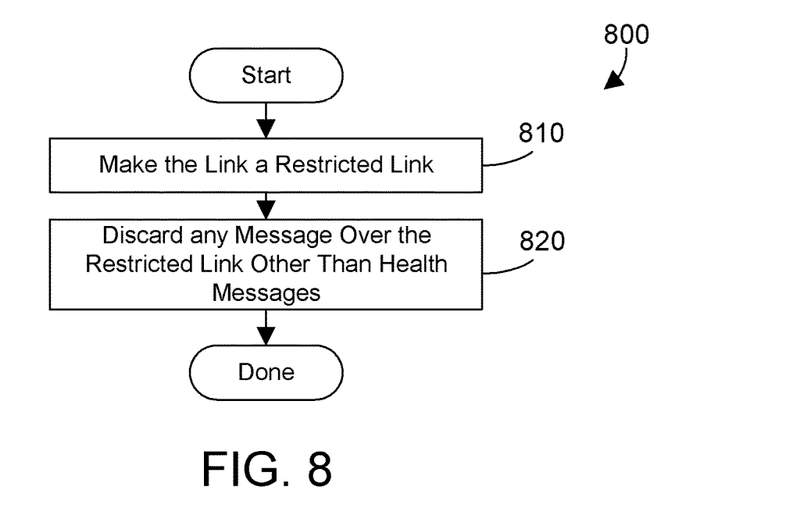
FIG. 8 is a flow diagram of a specific method for step 640 in FIG. 6.

FIG. 8 shows one suitable example of a method 800 for severing communication links to make a stable cluster topology. Method 800 thus shows a suitable method for performing step 640 in method 600. First, make the communication link a restricted link (step 810). Next, discard any messages over the restricted link other than health messages (step 820). The method 800 is then done.

The disclosure and claims herein relate to site asymmetric topology reconciliation in a computer cluster. A site asymmetric topology reconciliation module (SATRM) provides a stable topology for nodes located at different sites of the cluster during loss and reconnection of communication links. When there is an unstable cluster topology due to a loss in the communication links, the SATRM severs links to one or more nodes to create a stable topology. When a communication links recovers, the SATRM merges nodes to create a stable topology with the nodes connected to the recovered communication links.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An article of manufacture comprising software residing on a physical computer readable storage medium, the software comprising:
   a site asymmetric topology reconciliation module (SATRM) that monitors communication links of a computer cluster and determines if there are sites in the computer cluster with an asymmetric view of other sites, wherein the SATRM severs at least one communication links to form a stable topology when there is a site with an asymmetric view of the cluster; and
   wherein the SATRM severs one or more communication links to form a stable topology by making the communication link a restricted link and by discarding any message over the communication link other than health messages.

2. The article of manufacture of claim 1 wherein the SATRM determines if there are sites in the computer cluster with an asymmetric view of other sites in the computer cluster by sending heartbeat messages on the communication links that contain information regarding a connection state of the communication link.

3. The article of manufacture of claim 2 wherein the SATRM further determines a site in the computer cluster has an asymmetric view of other sites by adding a number of nodes with an upbeat state and a number of nodes with a downbeat state within each site, and determining a site in the computer cluster has an asymmetric view of other sites when a first site sees a smaller count of nodes with the upbeat state and the downbeat state than seen by a second site, where the upbeat state indicates a communication link that is fully operational and the downbeat state indicates a communication link that can exchange heartbeat packets but is not fully functional.

4. The article of manufacture of claim 3 wherein the SATRM determines the cluster has a stable topology when nodes on all sites of the computer cluster see the same total count of the upbeat state and the downbeat state.

5. The article of manufacture of claim 3 wherein the upbeat state and the downbeat state for each node are stored in a topology map.

6. The article of manufacture of claim 1 wherein the SATRM determines the cluster does not have sites with an asymmetric view and attempts to merge sites with healed links to form a larger cluster topology.

7. The article of manufacture of claim 1 wherein a copy of the SATRM executes in at least one node in each site of the cluster and maintains a local copy of a cluster topology map in each site.

8. A computer-implemented method executed by at least one processor for site asymmetric topology reconciliation in a computer cluster comprising:
 monitoring communication links in the computer cluster;
 determining if there are sites in the computer cluster with an asymmetric view of other sites in the computer cluster;
 when there is a site with an asymmetric view of the cluster, severing at least one communication link to form a stable topology; and
 wherein the step of severing one or more communication links to form a stable topology further comprises making the communication link a restricted link and by discarding any message over the communication link other than health messages.

9. The method of claim 8 further comprising determining the cluster does not have sites with an asymmetric view and attempting to merge sites with healed links to form a larger cluster topology.

10. The method of claim 8 wherein a local copy of a cluster topology map is maintained in each site.

11. The method of claim 10 wherein the upbeat state and the downbeat state for each node are stored in the cluster topology map.

12. A computer-implemented method executed by at least one processor for site asymmetric topology reconciliation in a computer cluster comprising:
 monitoring communication links in the computer cluster;
 determining if there are sites in the computer cluster with an asymmetric view of other sites in the computer cluster, wherein the step of severing one or more communication links to form a stable topology further comprises making the communication link a restricted link and by discarding any message over the communication link other than health messages;
 when there is a site with an asymmetric view of the cluster, severing at least one communication link to form a stable topology;
 determining the cluster does not have sites with an asymmetric view and attempting to merge sites with healed links to form a larger cluster topology; and
 determining the cluster has a stable topology when nodes on all sites of the computer cluster see the same total count of the upbeat state and the downbeat state.

13. The method of claim 12 wherein a local copy of a cluster topology map is maintained in each site.

14. The method of claim 12 wherein the upbeat state and the downbeat state for each node are stored in the cluster topology map.

* * * * *